US006470719B2

(12) United States Patent
Franz et al.

(10) Patent No.: US 6,470,719 B2
(45) Date of Patent: Oct. 29, 2002

(54) DIRT-FREE HANDLE FOR THE OPENING OF TRUNK LIDS OF MOTOR VEHICLES

(75) Inventors: Erhard Franz, Rödermark; Richard Jurr, Weilmünster, both of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/804,429

(22) Filed: Mar. 12, 2001

(65) Prior Publication Data

US 2001/0011467 A1 Aug. 9, 2001

Related U.S. Application Data

(63) Continuation of application No. 09/022,661, filed on Feb. 12, 1998.

(30) Foreign Application Priority Data

Feb. 21, 1997 (DE) ........................................ 197 06 952

(51) Int. Cl.[7] ................................................ B60R 25/02

(52) U.S. Cl. .......................... 70/208; 70/257; 70/279.1; 292/336.3; 292/201; 292/DIG. 27; 292/DIG. 42

(58) Field of Search .......................... 70/208, 256, 257, 70/279.1; 292/DIG. 27, 42, 43, 336.3, 201

(56) References Cited

U.S. PATENT DOCUMENTS

| | | | |
|---|---|---|---|
| 3,432,631 A | 3/1969 | Deutscher | |
| 4,458,930 A | 7/1984 | Goike et al. | 70/279 |
| 4,677,834 A | 7/1987 | Hicks | 70/279 |
| 5,058,258 A | 10/1991 | Harvey | 70/257 X |
| 5,445,326 A | 8/1995 | Ferro et al. | 292/336 |
| 5,688,004 A | 11/1997 | Karge | 292/201 X |
| 5,697,236 A | 12/1997 | Kleefeldt et al. | 70/257 |

*Primary Examiner*—Suzanne Dino Barrett
(74) *Attorney, Agent, or Firm*—Martin A. Farber

(57) ABSTRACT

A closing device for a the door, trunk lid or the like, which has a lock mechanism (1) with an actuating drive (4) for the driving of at least one structural part of the lock mechanism. The actuating drive furthermore drives an opening aid (8) of the door, the trunk lid or the like.

8 Claims, 6 Drawing Sheets

DIRT-FREE HANDLE FOR THE OPENING OF TRUNK LIDS OF MOTOR VEHICLES

This is a continuation of application Ser. No. 09/022,661 filed Feb. 12, 1998.

FIELD AND BACKGROUND OF THE INVENTION

The present invention relates to a closing device for a door, a trunk lid or the like, in particular of a motor vehicle, in accordance with the preamble to claim 1.

From Federal Republic of Germany 38 40 591 A1, a closing device is known which has a lock mechanism (with rotary latch and pawl) having an actuating drive for the driving of a component (rotary latch) of the lock mechanism. The actuating drive sees to it that when the trunk lid is closed, the movement down into the closed position is detected electrically by a sensor, whereupon the electric actuating drive is placed in operation so as to move the trunk hook into its closed position by means of the lock mechanism.

This known closing device in itself operates satisfactorily, but it may occur that upon the movement of the trunk lid from its open position into its closed position dirtying of the operator cannot be avoided.

SUMMARY OF THE INVENTION

The object of the invention is therefore to provide a comfortable closing device which can be produced with the fewest possible parts.

According to the invention the actuating drive (4) furthermore drives an opening aid (8) of the door, the trunk lid or the like.

The sole actuating drive takes over in this connection both of these tasks, namely on the one hand to move the structural part of a lock mechanism, particularly a rotary latch, for the door, the trunk lid or the like, from a pre-engagement position into the main-engagement position (closed position) and at the same time to extend an operating part (handle or the like) of an opening aid (in particular, the trunk lid) is to be opened and then to retract it when the closing process is complete. For this purpose, the actuating drive is connected as a function of an opening command given by the driver of the vehicle and move out at least the operating part of the opening aid. Furthermore, an operating part of the lock mechanism (in particular, the pawl) may, but need not, be unlocked so that, in particular, the trunk lid can be opened by means of the operating part. Shortly after the opening, the operating part can be moved in again or it can remain in the extended position until the door, the trunk lid or the like is again completely closed or at least until it has been brought into the pre-engagement position. When the door, the trunk lid or the like is in the pre-engagement position or in the main engagement position, which are detected in some suitable manner, the actuating drive is connected and the operating part of the opening aid is retracted. A preferred embodiment resides therein that the door, the trunk lid or the like is brought into the pre-engagement position by means of the operating part of the opening aid, the pre-engagement position is detected, and the actuating drive is then connected, it then moving the door, the trunk lid or the like into the main engagement position and at the same time connecting the actuating drive which then moves the door, the trunk lid or the like into the main engagement position and at the same time moving the operating part of the opening aid.

BRIEF DESCRIPTION OF THE DRAWINGS

Further developments of the invention are set forth in the dependent claims, from which advantageous effects can also be noted, they being described below and shown in the figures on the basis of two detailed embodiments.

In the drawings.

DETAILED DESCRIPTION OF THE PREFERRED EMBODIMENTS

Figure 1:
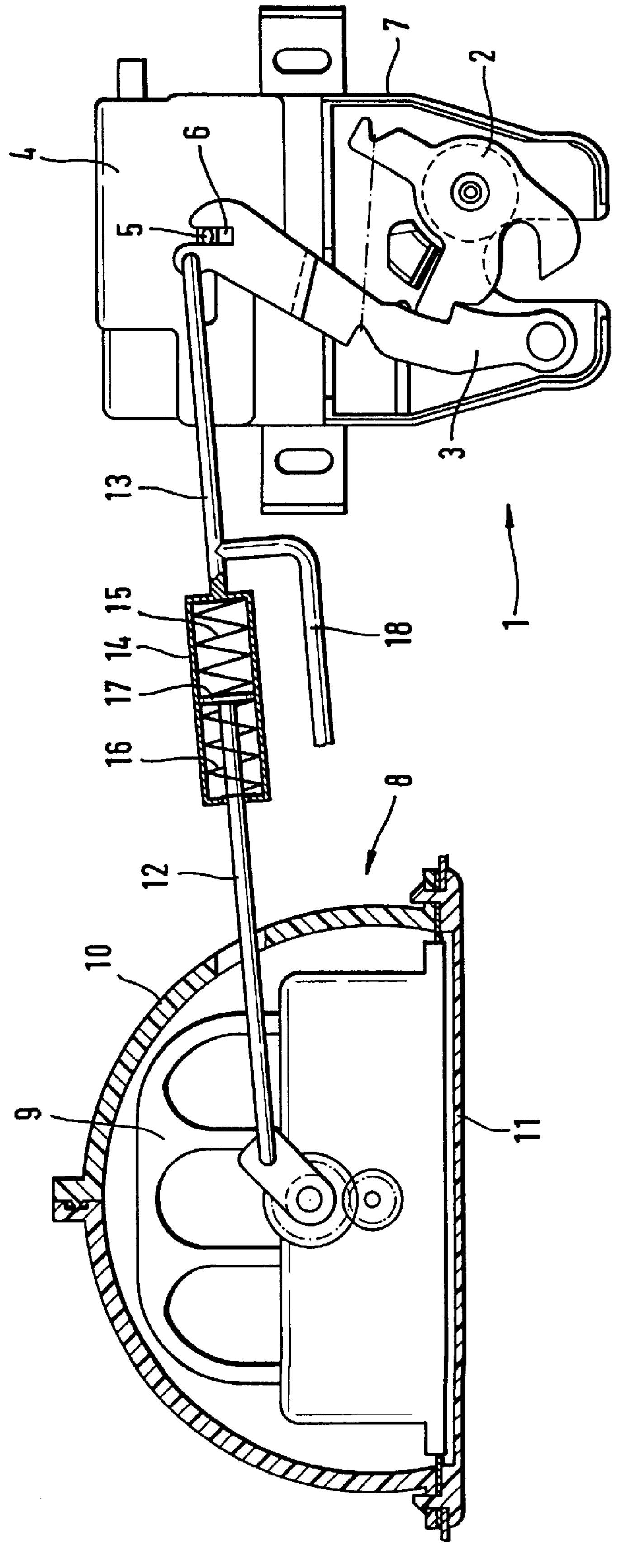
FIG. 1 shows the positions: lock/locked, handle part moved inward.

FIGS. 1 to 4 show a first embodiment, shown in various positions. For easier viewing, reference numerals have been provided only in FIG. 1, the components provided with reference numerals in FIG. 1 appearing also in FIGS. 2 to 4.

FIG. 1 shows a lock mechanism 1 which, in known manner, has a rotary latch 2 and a pawl 3 which locks or releases the rotary latch 2. The rotary latch 2 surrounds a stationary closure bolt, not shown.

The lock mechanism 1 furthermore has an actuating drive 4 which is developed as a linear drive and has a pin 5. The actuating drive 4 consists of an electric motor, the rotation of which is converted by a conversion transmission (for instance, a step-down gearing) into a linear movement for the pin 5. Instead of an electric motor, electromagnets as well as actuating drives having a rotary movement can be used. The pin 5 engages into a recess 6 in the pawl 3, so that in the position shown in FIG. 1 the pawl 3 holds the rotary latch 2 and thus locks the lock mechanism 1, and therefore the door, the trunk lid or the like is closed. The lock mechanism 1 can be developed as an independent module, the components being arranged within a housing 7 for this purpose.

In accordance with the practice of the invention, it is recognized that it is useful to have an opening aid 8 which, via a suitable coupling mechanism, is connected to the lock mechanism 1 for driving the lock mechanism 1 to perform a task, such as the release of a trunk lid in a vehicle. The opening aid 8 serves as an alternative to the actuating drive 4 for driving the lock mechanism 1 between the positions of pre-engagement and main engagement. The invention addresses the situation in which the opening aid 8 has a manually operable handle part 9 which may become dirty in use. A dirtying of the handle part 9 may jam the opening aid 8 so as to immobilize the opening aid 8. Therefore, in accordance with a feature of the invention, the coupling mechanism includes an assembly of springs 15 and 16 located within a housing 14 for coupling movement of the opening aid 8 (particularly movement of the handle part 9) to movement of the actuating drive 4 when the opening aid 8 is free to move, while permitting movement of the actuating drive 4 when the opening aid 8 is jammed.

Figure 2:
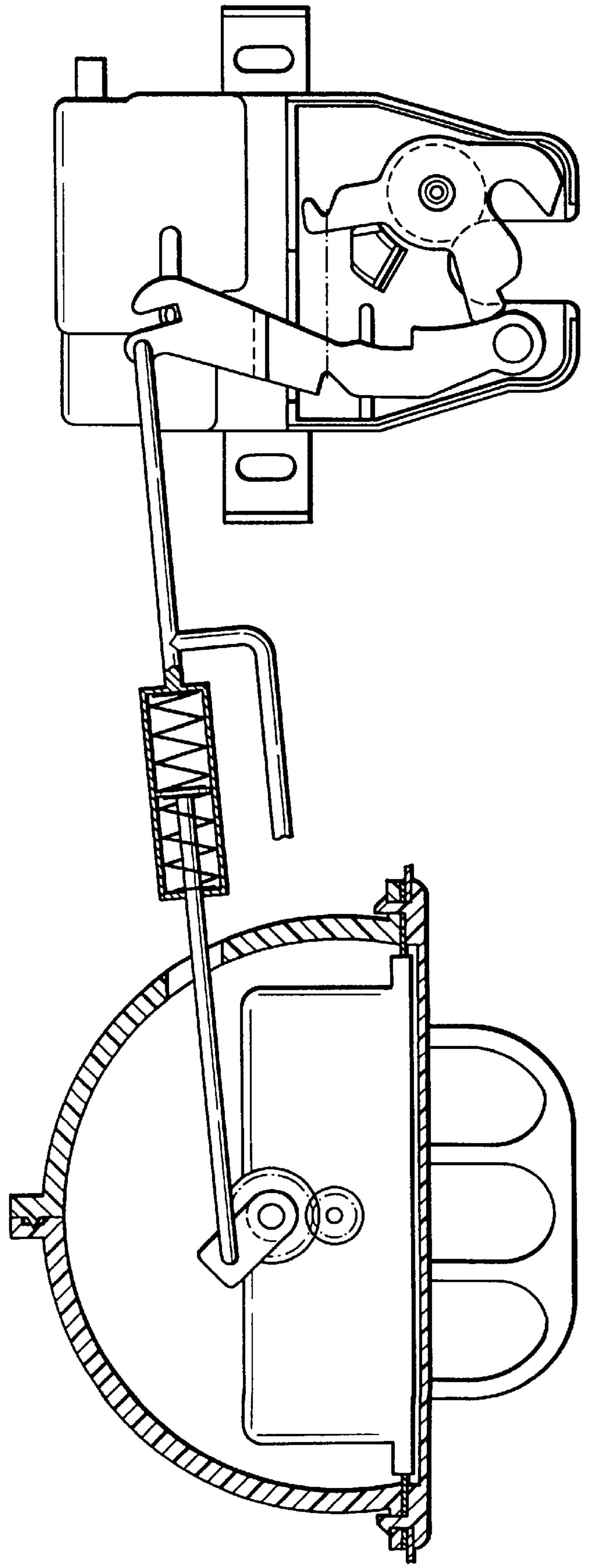
FIG. 2 shows the positions: lock unlocked/handle part moved outward.
Figure 3:
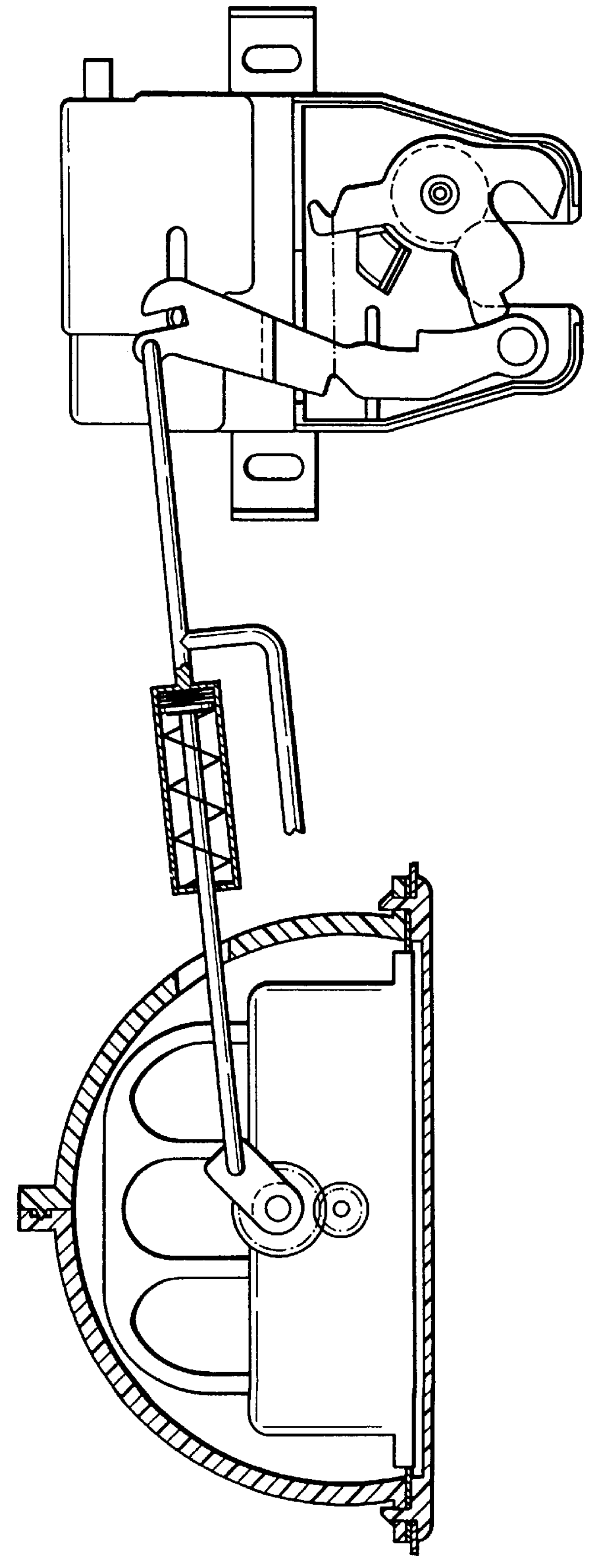
FIG. 3 the defect position: handle part moved inward and blocked.
Figure 4:
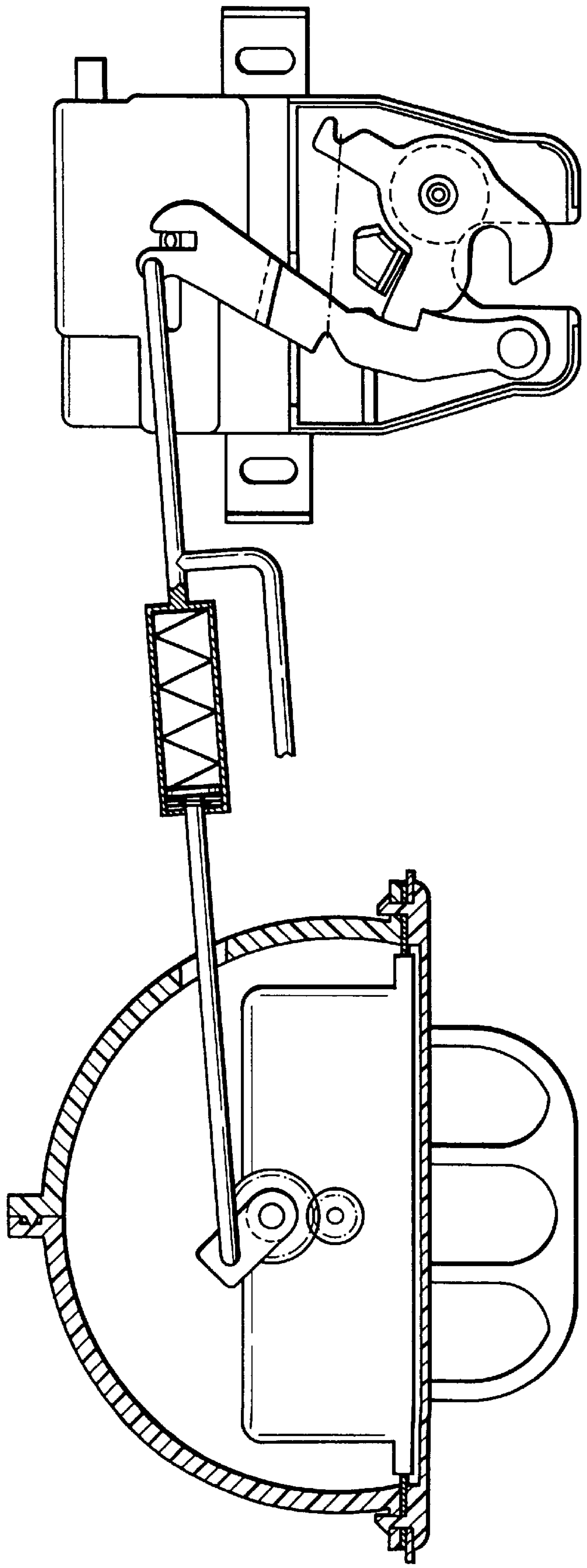
FIG. 4 the defect position: handle part moved outward and blocked.

The coupling mechanism connects via connecting rods 12 and 13, respectively, to the opening aid 8 and the lock mechanism 1. In the construction of the coupling mechanism 1, the two springs 15 and 16 are arranged between end walls of the housing 14 and contact a plate 17 at a location between the end walls of the housing. The plate 17 serves as a plate-shaped end 17 of the connecting rod 12. The connecting rod 12 passes through an end wall of the housing 14 and enables movement of the plate 17 upon deflection of the springs 15 and 16. The other connecting rod 13 terminates at the opposite end wall of the housing 14. Thereby, relative motion between the connecting rods 12 and 13 occurs upon deflection of the springs 15 and 16 with displacement of the plate 17 relative to the housing 14 (as shown in FIGS. 2–4), and a fixed relationship between the connecting rods 12 and 13 is maintained in the absence of deflection of the springs 15 and 16. The springs 15 and 16 are sufficiently stiff so that no significant deflection occurs during normal operation of the trunk release (no jamming of the handle part 9); however, deflection of the springs does occur upon jamming of the handle part 9. The fixed relationship between the coupling rods 12 and 13 provides for a coupling between the motions of the opening aid 8 and the actuating drive 4, while the relative motion between the connecting rods 12 and 13 decouples motion of the actuating drive 4 from a jamming of the opening aid 8. Further details in the construction and operation of the coupling mechanism are described as follows.

Furthermore there is provided an opening aid 8 which can also be developed as an independent module. The opening aid 8 which is arranged behind a body wall of the door, the trunk lid or the like has a handle part 9 which, in the position shown in FIG. 1, is moved back into a housing 10. One end 11 of the handle part 9 faces towards the outside and thus prevents dirtying of the handle part 9. Via connecting rods 12, 13 (in which connection, other transmission elements such as Bowden cables for instance are also conceivable), the lock mechanism 1 and the opening aid 8 are connected together. The lock mechanism 1 (or its connecting rod 13), and the opening aid 8 (or its connecting rod 12) can be disconnected by springs 15, 16 arranged in a cup-shaped housing. The connecting rod 12 has a plate-shaped end 17 within the housing 14, the spring 16 resting on the one end against the housing 14 and on the other side against the plate-shaped end 17. The connecting rod 13 has at its end the cup-shaped housing 14, the spring 15 resting within the housing 14 against the plate-shaped end 18 on the side thereof facing away from the spring 16. The spring force of the springs 15 and 16 is such that the linear movement of the actuating drive 4 is transmitted via the springs 15, 16 to the opening aid 8. The reference numeral 18 indicates further a connection to a closing cylinder by means of which the lock mechanism 1 can be actuated manually in the event of a defect, i.e. if the actuating drive 4 can be overridden.

The decoupling between the lock mechanism 1 and the opening aid 8 has the advantage that the lock mechanism 1 can still be actuated even if the opening aid 8 can no longer be moved. It is also an advantage that by actuation of the handle part 9, the actuating drive 4 cannot be moved so that an effective protection against theft is provided. For this purpose, the springs 15 and/or 16 are so dimensioned that the self-holding force of the actuating drive is greater than their spring force. The uncoupling shown in FIG. 1 is merely illustrative, and other embodiments which have the same manner of operation, or at least a similar kinematic manner of operation, are of course possible. The connection between the lock mechanism land the opening aid 8 furthermore need not necessarily be a linearly acting connection so that rotary movements for instance are also possible here. Thus, for instance, the lock mechanism 1 and the opening aid 8 may form a component, in which case the actuating drive 4 also carries out a rotary movement., which it carries out both on the pawl 8, possibly stepped-down, as well as on the handle part 9, here also possibly stepped-down. The connection between actuating drive 4 and handle part 9 can, for instance, be a stepped-down transmission which can be uncoupled by means of a retaining spring which is arranged on a shaft of the transmission and acts in two directions.

FIG. 2 shows the positions in which the lock (the rotary latch 2) is unlocked and the handle part 9 is moved out. This is the case, for instance, when the driver of the vehicle has made known an opening desire by a remote control.

FIG. 3 shows the defect case that while the lock has been unlocked and the actuating drive 4 has moved, the handle part 9 has, however, been moved inward and blocked. In this case, unlocking is brought about in the manner that the spring 15 is compressed or the spring 16 relaxed. The lock mechanism 1 remains operative so that the door, the trunk lid or the like can be opened. Only the opening aid 8 is then no longer available.

FIG. 4 shows the defect case that, while the handle part 9 has been moved out, it is however locked in this position. In this case, the spring 16 is then compressed and the spring 15 for instance relaxed, so that, as previously, after actuation of the actuating drive 4, the rotary latch 2 is active. As a result of the development of the unlocking by the springs 15, 16, the handle part 9 can also block in any desired position between the inward moved position and the extended position, so that now, as previously, the rotary latch 2 or the opening function of the lock mechanism 1 remains active.

The same also applies in the event that the handle part 9 is actuated in unauthorized fashion so that actuation of the actuating drive 4 or actuation of the pawl 3 together with a release of the rotary latch 2 due to outside actuation of the handle part 9 is prevented.

Figure 5:
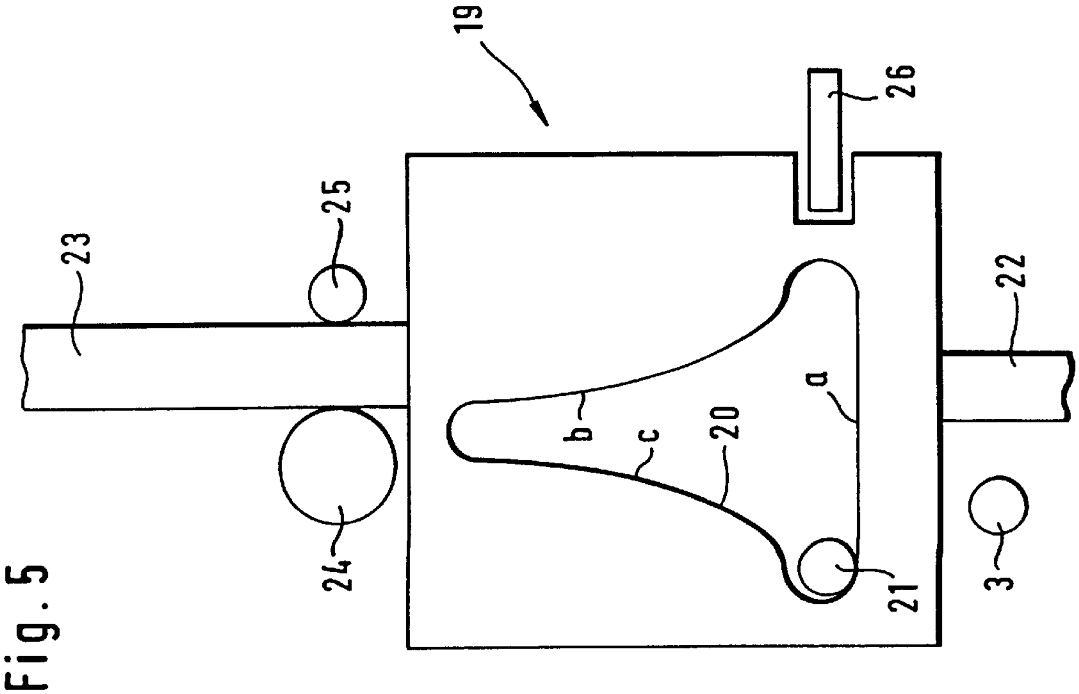
FIG. 5 the development of a cam positioner.

FIG. 5 shows the development of a cam positioner 19 by which it is also possible, with only one drive, to actuate both the lock mechanism 1 and the opening aid 8. The cam positioner 19 has a drive cam 20 which is connected with a drive wheel 21. The drive wheel 21 can, for instance, be a friction wheel or a gear wheel, in which case the drive cam 20 is developed in corresponding manner. The cam positioner 19 has, further, an actuating element 22 which is developed for the drive of the structural part of the lock mechanism 1, in particular of the pawl 3. On the other hand, another actuating element 23 is provided, which acts on an output drive gear 24, the output drive gear 24 being in operative connection with the opening aid 8. Here, also—to be sure, not shown but still present—there is the decoupling between the cam positioner 19 and the opening aid 8. Opposite the output drive gear 24 there is furthermore provided a counter support 25. In the position of the cam positioner 19 shown in FIG. 5, the lock mechanism 1 is in the locked position and the opening aid 8 or its handle part 9 is in the inward moved position, in which case then, for reasons of protection against theft, the cam positioner 19 is locked by means of an unlockable locking pin 26.

Figure 6:
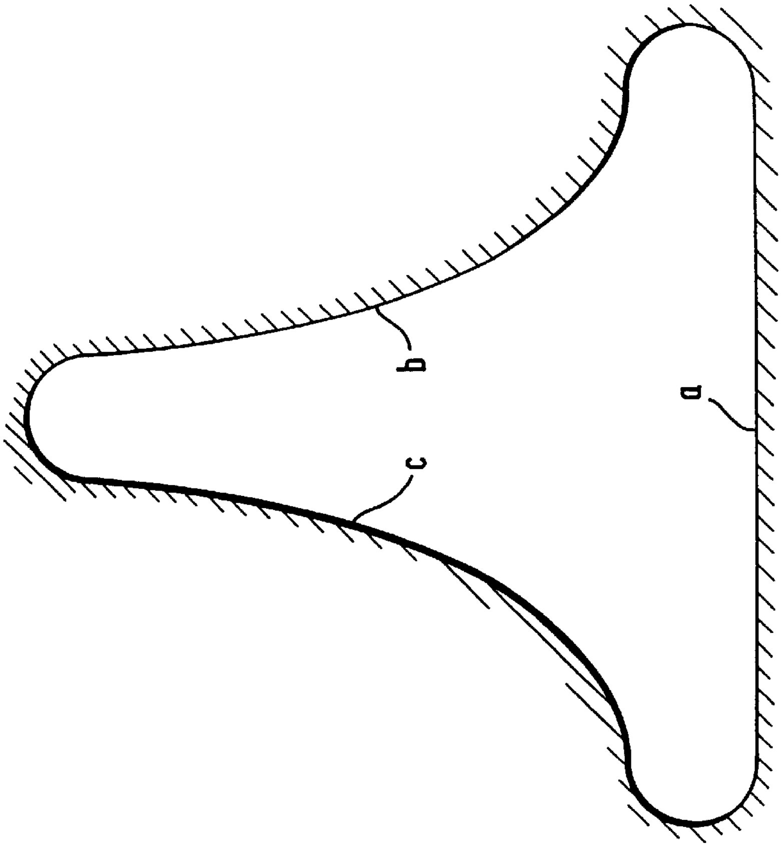
FIG. 6 the operating regions of the cam positioner.

FIG. 6 shows the operating regions of the cam positioner 19 which carries out a substantially linear movement along its side a, a linear stroke of the actuating element 23 being carried out during movement along the sides 2 and c, the handle part 9 of the opening aid 8 being moved inward and outward by means of the linear stroke.

Figure 7:
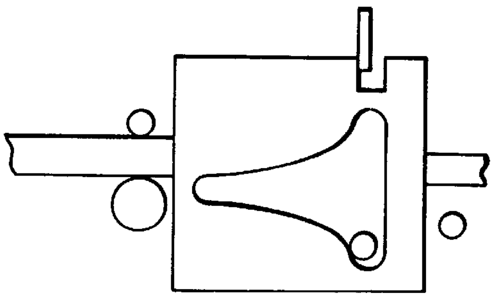
FIGS. 7 to 12: the phases of movement of the cam positioner.
Figure 8:
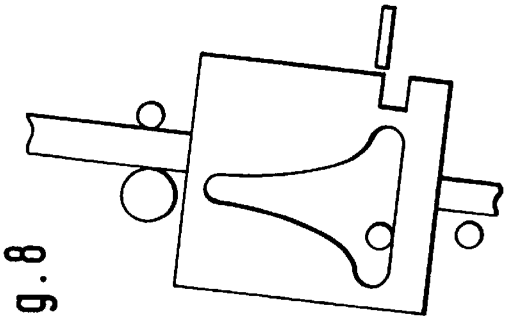
Figure 9:
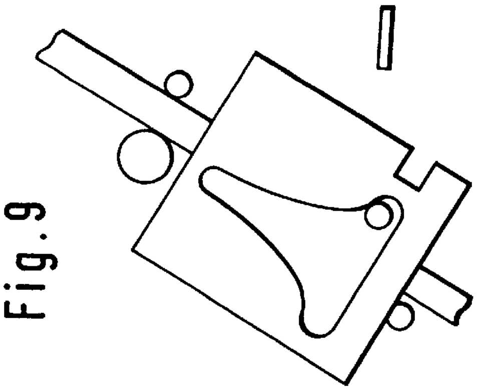
Figure 10:
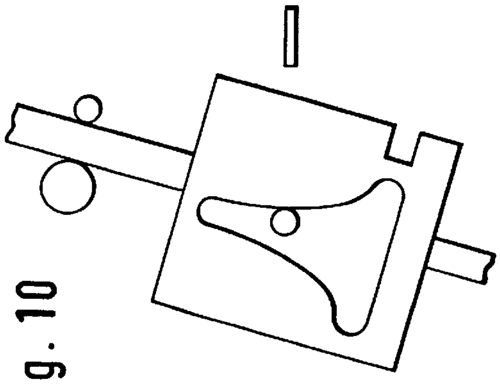
Figure 11:
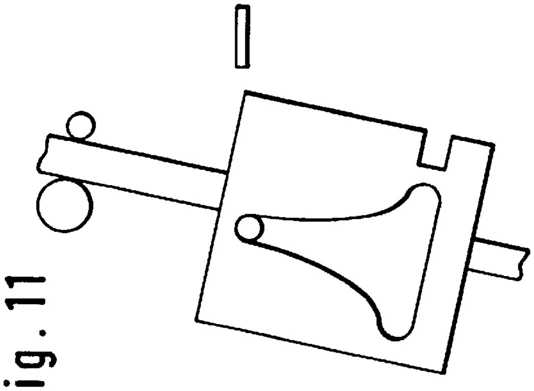
Figure 12:
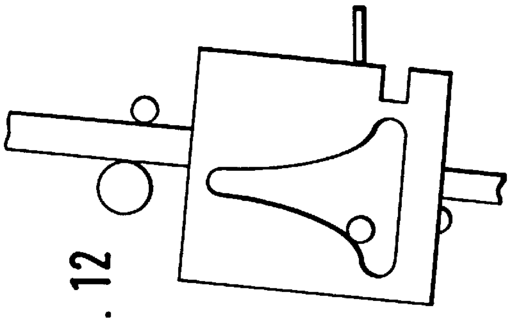

In order to shown the manner of operation of the cam positioner 19, the phases of movement of the cam positioner 19 are shown in FIGS. 7 to 12. FIG. 7 shows the starting position in which the lock mechanism 1 is locked and the handle part 9 is moved inward. If an actuating drive is connected for the driving of the drive wheel 21, then the cam positioner carries out a linear movement which results in the unlocking of the pawl 3. Following this, as shown in FIG. 9, the movement takes place in the direction towards the reversal point, followed by the linear stroke movement shown in FIG. 10 along the side 2 which effects the moving out of the handle part 9. At the upper reversal point in FIG. 11, the handle part 9 is completely moved out and then, upon linear stroke movement in opposite direction along the side c, moved in again, as shown in FIG. 12. If the drive wheel 21 has again arrived at the left reversal point, this corresponds to the initial position shown in FIG. 7.

For the development of the drive cam 20 and the drive wheel 21, racks/gears, drive rails with crenellations, zig-zag bars, perforated bands, prong belts or the like are also conceivable.

Furthermore, at least one counter-support can also be present in the region of the actuating element 22. Both this counter-support and the counter-support 25 can consist of a spring-loaded roll (friction wheel) or of two rolls associated with each other which are acted on by force (for instance, spring-loaded). As a result, not only is a support created, but it is furthermore also possible to transmit the drive force to the actuating element or to create a freewheel. If the action of the force is greater than the input or output force, an input or output force takes place; if the action of the force is less, then we have a freewheel. This can be adjusted, for instance, by means of the geometrical development of the actuating element in that it has different thicknesses in partial regions (widths, stepped or continuous). Change of the action of force is also possible in the case of a uniformly thick development of the actuating element. With the embodiment shown in FIG. 5, the pawl 3, for instance, is always driven by the actuating element 22, while the counter-support 25 is acted on by force. Thus a force which acts on the output wheel 24 and is greater than the holding force of the cam positioner 19, can also not lead to an actuation of the cam positioner 19 since in this case the freewheel acts.

What is claimed is:

1. Locking device comprising an opening aid (8) with an opening part for a door or a tailgate, and further comprising a lock mechanism (1) having an actuating drive (4) to drive a component of the lock mechanism (1) between a pre-engagement position and a main-engagement position, and concurrently to drive an operating part of the opening aid (8) between an extended position and a retracted position, the lock mechanism (1) and the opening aid (8) being connected to each other by transmission elements implementing the actuating drive, wherein the connection of the lock mechanism (1) to the opening aid (8) can be uncoupled and wherein the transmission elements have springs (15, 16) for transmitting the movement of the actuating drive (4) to the opening aid (8).

2. Locking device according to claim 1, wherein the connection of the lock mechanism (1) to the opening aid (8) comprises a first connecting rod (13), which is connected to the lock mechanism (1) and can be driven in a linearly movable manner, and a second connecting rod (12), which is connected to the opening aid (8) and can likewise be moved linearly, the linear movement of the connecting rod (13) of the lock mechanism (1) being transmittable to the connecting rod (12) of the opening aid (8) by springs (15, 16).

3. Locking device according to claim 1, wherein the actuating drive (4) is connected to a handle part (9) of the opening aid (8) by the transmission elements.

4. Locking device according to claim 1, wherein, in the event of a defect, the actuating drive (4) can be overridden manually by means of a connection (18) to a locking cylinder.

5. Locking device according to claim 1, wherein the lock mechanism (1) and the opening aid (8) form a constructional unit.

6. Locking device according to claim 1, wherein the actuating drive (4) is coordinated with the lock mechanism (1) or the opening aid (8).

7. Locking device comprising:

a lock mechanism with an actuating drive for driving the lock mechanism between positions of pre-engagement and main engagement;

an opening aid, and a connection mechanism which connects the opening aid to the lock mechanism, the opening aid providing via the connection mechanism a driving of the lock mechanism between the positions of pre-engagement and main engagement; and wherein the connection mechanism includes a spring assembly which couples movement of the opening aid to movement of the actuating drive when the opening aid is free to move, the spring assembly permitting movement of the actuating drive when the opening aid is jammed.

8. Locking device according to claim 7, wherein the opening aid includes a manually operable handle.

* * * * *